United States Patent
Peterson et al.

(10) Patent No.: US 6,301,266 B1
(45) Date of Patent: Oct. 9, 2001

(54) NETWORK MANAGER AND METHOD THEREOF FOR A COMMUNICATION SYSTEM

(75) Inventors: Larry M. Peterson, West Dundee; Vijay Agarwal, Streamwood; Eliza Ballew, Schaumburg; Kristin Cramer, Palatine; Lana Dubinsky, Buffalo Grove; John D. Harper; Brad Karch, both of Schaumburg; Randall G. Kremske, Woodstock; Steven A. Matz, Deerfield, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/247,386

(22) Filed: Feb. 10, 1999

(51) Int. Cl.[7] .................................. H04J 3/16; H04J 3/22
(52) U.S. Cl. ......................... 370/465; 370/254; 709/223
(58) Field of Search .................................. 370/465, 477, 370/486, 216, 229, 231, 236, 241, 242, 243, 244, 245, 246, 254, 255, 401; 709/220, 223, 224

(56) References Cited

U.S. PATENT DOCUMENTS

| | | | |
|---|---|---|---|
| 5,751,963 | * | 5/1998 | Umetsu ................................ 709/223 |
| 5,958,012 | * | 9/1999 | Battat et al. ......................... 709/224 |
| 5,966,128 | * | 10/1999 | Savage et al. ....................... 345/356 |
| 6,035,331 | * | 3/2000 | Soga et al. .......................... 709/223 |
| 6,052,722 | * | 4/2000 | Taghadoss ........................... 709/223 |
| 6,085,243 | * | 7/2000 | Fletcher et al. ...................... 709/224 |
| 6,115,743 | * | 9/2000 | Cowan et al. ....................... 709/224 |
| 6,119,156 | * | 9/2000 | Fillon et al. ......................... 709/220 |

* cited by examiner

Primary Examiner—Douglas Olms
Assistant Examiner—Brian Nguyen
(74) Attorney, Agent, or Firm—Susan L. Lukasik; Steven R. Santema

(57) ABSTRACT

A method of managing objects residing in a communication system includes the steps of reading (201), by a network manager for a plurality of objects represented by at least one agent and residing in a communication system, a mapping of bitmap types to object types and monitoring (203) at least one communication resource between the network manager and the at least one agent. After service interruption on one communication resource of the at least one communication resource, and upon detecting (207) a return to service of the one communication resource, the network manager reads at least one bitmap from the at least one agent, wherein the at least one bitmap represents information relating to at least one object of the plurality of objects, and interpreting (213) the at least one bitmap by utilizing the mapping of bitmap types to object types in order to determine a status of the at least one object of the plurality of objects.

14 Claims, 3 Drawing Sheets

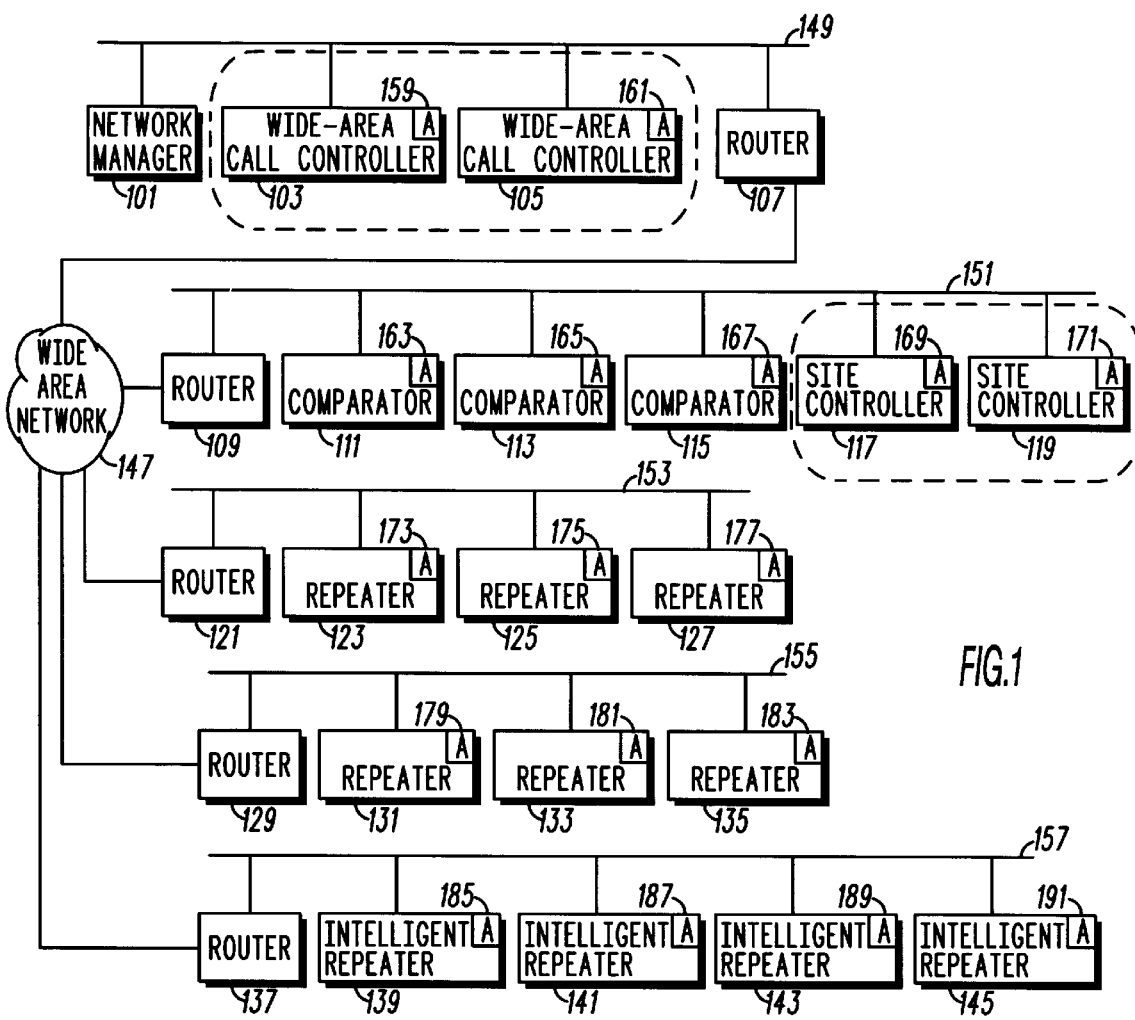
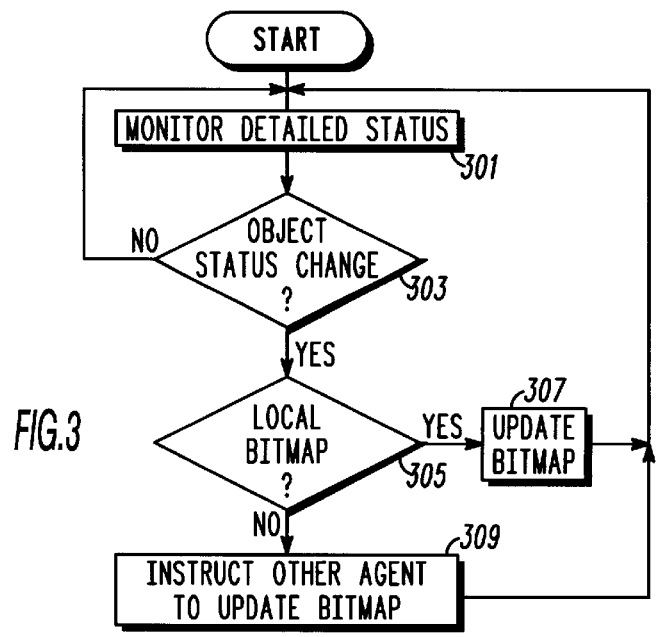

ized as trunked communication systems, where a plurality of communication resources is allocated amongst a group of users by assigning the repeaters on a communication-by-communication basis within an RF coverage area.

NETWORK MANAGER AND METHOD THEREOF FOR A COMMUNICATION SYSTEM

FIELD OF THE INVENTION

This invention relates to communication systems, including but not limited to managing objects within radio frequency (RF) communication systems.

BACKGROUND OF THE INVENTION

The basic operation and structure of a land mobile communication system is well known. Land mobile communication systems typically comprise one or more communication units (e.g., vehicle-mounted or portable communication units in a land mobile system and communication unit/ telephones in a cellular system) and one or more repeaters that transceive information via the RF communication resources. These communication resources may be narrow band frequency modulated channels, time division multiplex slots, frequency pairs, and so forth. Land mobile communication systems may be organized as trunked communication systems, where a plurality of communication resources is allocated amongst a group of users by assigning the repeaters on a communication-by-communication basis within an RF coverage area.

A communication system is comprised of a plurality of parts or objects, including devices, parts of the devices, and logical/physical entities. At various times throughout the lifetime of a communication system, each of the objects within the system may enter into an abnormal state or condition. An abnormal condition or state includes situations where the object has failed or malfunctioned, the object is not performing up to specification, an illegal carrier is detected on a channel or link, communication resource interference is detected, an object fails to respond, an object is under maintenance, and so forth. In order to maintain a communication system as efficiently as possible, it is desirable to know the present state of each of these objects. Prior systems engage various methods of keeping track of their objects, but systems typically track status either by polling each object (asking each object for its status), which is wasteful of bandwidth and time-consuming for large systems, or by receiving periodic status updates from various objects, which may not provide for constantly updated tracking information.

Accordingly, there is a need for an efficient method of obtaining and updating status information for all objects in a system that is either large or small, without wasting valuable bandwidth to perform the function.

BRIEF DESCRIPTION OF THE DRAWINGS

FIG. 1 is a block diagram of a communication system in accordance with the invention.

FIG. 3 is a flowchart showing a method of updating and maintaining a bitmap by an agent in accordance with the invention.

DESCRIPTION OF A PREFERRED EMBODIMENT

Figure 2:
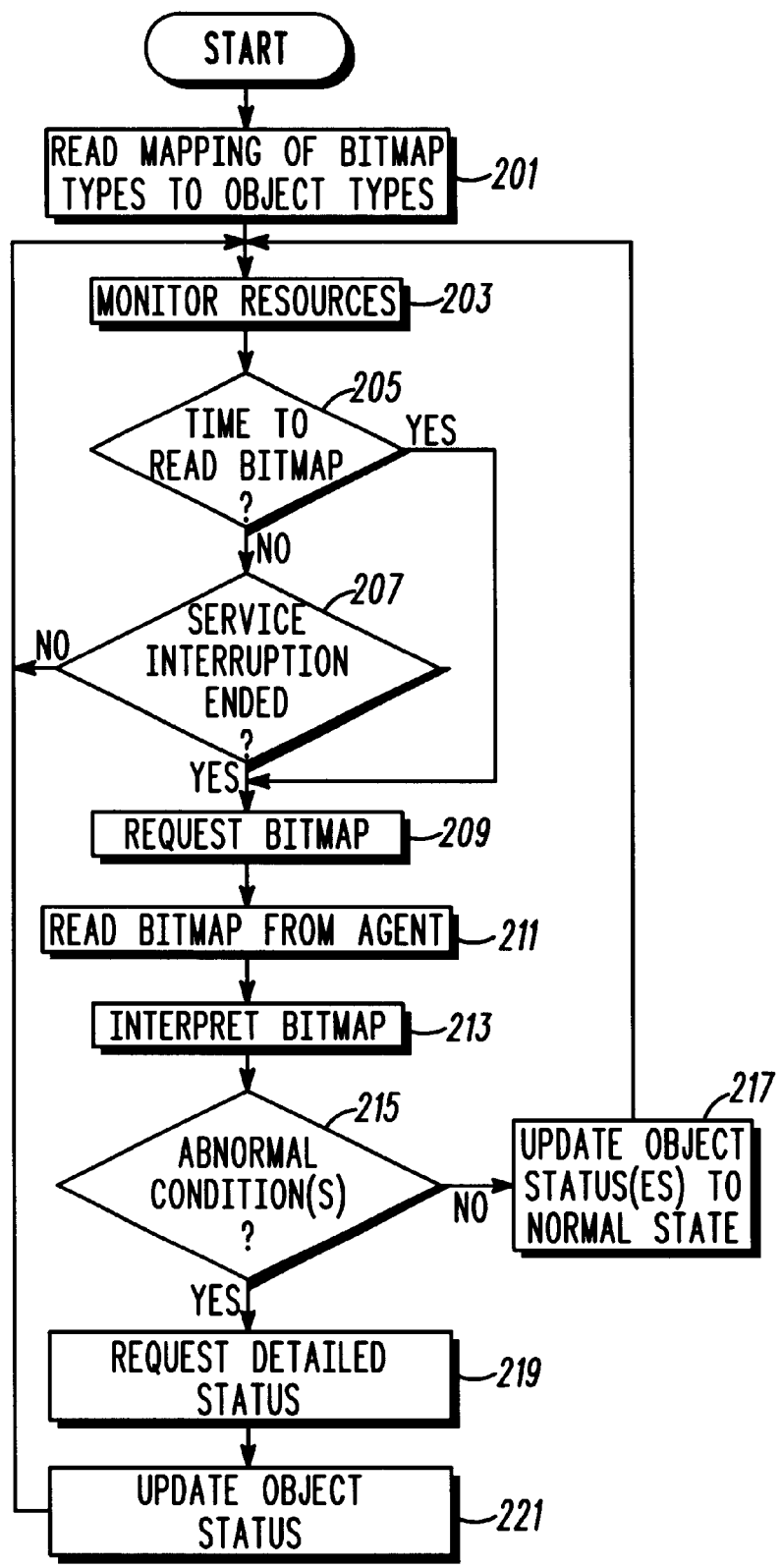
FIG. 2 is a flowchart showing a method of reading and interpreting bitmaps in accordance with the invention.

The following describes an apparatus for and method of efficiently obtaining and updating status information for all objects in a system that is either large or small, without wasting valuable bandwidth to perform the function. The present invention includes a method of utilizing local agents to represent a plurality of objects. One or more agents update and store status information in the form of bitmaps, in addition to storing detailed status information for each object. A network manager schedules and/or selects times when a request for one or more bitmaps is made to one or more agents. The network manager interprets the bitmaps by utilizing a mapping of bitmap types to object types.

A method of the present invention comprises the steps of reading, by a network manager for a plurality of objects represented by at least one agent and residing in a communication system, a mapping of bitmap types to object types and monitoring at least one communication resource between the network manager and the at least one agent. After service interruption on one communication resource of the at least one communication resource, and upon detecting a return to service of the one communication resource, the network manager reads at least one bitmap from the at least one agent, wherein the at least one bitmap represents information relating to at least one object of the plurality of objects. The network manager interprets the at least one bitmap by utilizing the mapping of bitmap types to object types in order to determine a status of the at least one object of the plurality of objects. The method may also contain the steps of updating, by the network manager, the status for the at least one object of the plurality of objects in a storage device within the network manager; displaying, by the network manager, the status of the at least one object of the plurality of objects to a user of the network manager; when the status of the at least one object indicates an abnormal condition, requesting, by the network manager, a detailed status of the at least one object from the at least one agent; and/or requesting, by the network manager, that the at least one agent send to the network manager a current bitmap for the at least one object of the plurality of objects at any time while the at least one communication resource remains in service The plurality of objects may be logical or physical entities within a radio frequency communication system. The at least one agent may be comprised of at least two agents, wherein a first agent of the at least two agents maintains a bitmap for the at least one object of the plurality of objects, and wherein a second agent of the at least two agents maintains a detailed status for the at least one object of the plurality of objects, and the method may further comprise the step of, when the status of the at least one object indicates an abnormal condition, requesting, by the network manager, a detailed status from the second agent. When two or more agents have the capability of being the active agent for a subsystem, the method may further comprise the step of determining an active agent for the subsystem, and communicating with the active agent regarding bitmap activity for the subsystem, wherein the subsystem comprises a subset of the plurality of objects. The mapping of bitmap types to object types may be different for each subsystem of the communication system, wherein each subsystem comprises a subset of the plurality of objects. A network manager may be arranged and constructed to perform the steps of the method.

A method of updating and maintaining a bitmap by an agent in a communication system having a network manager for a plurality of objects that are represented by at least one agent comprises the steps of monitoring, by the at least one agent, a detailed status of at least one object of the plurality of objects, and upon detecting a change in detailed status of the at least one object, causing a bitmap for the at least one object to be updated to include the change in detailed status. The step of causing may comprise updating, by the at least one agent, the bitmap. The step of causing may comprise sending an instruction to update the bitmap to another agent, which then updates the bitmap. One bit of the bitmap may represent two or more objects of the plurality of objects, wherein a bit value of 1 represents an abnormal condition for at least one of the two or more objects, wherein a bit value of 0 represents a normal condition for all of the two or more objects, and the method may further comprise the step of providing an identity of whichever objects caused a bit value of 1 in a bitmap when the agent is queried for the source of an abnormal condition appearing in a bitmap.

Alternatively, in a communication system comprised of a network manager, a plurality of communication resources, and one or more subsystems, wherein a subsystem is represented by an active agent from a plurality of agents and wherein the subsystem is comprised of a plurality of objects, the method comprises the steps of reading, by the network manager, a mapping of bitmap types to object types and monitoring at least one communication resource, of the plurality of resources, between the network manager and the active agent. After service interruption on the at least one communication resource, and upon detecting a return to service of the at least one communication resource, subsystem information is requested for one subsystem of the one or more subsystems from the active agent. If valid subsystem information is not received from the active agent, a new active agent is determined from among the plurality of agents. The network manager requests at least one bitmap from the new active agent. The network manager reads the at least one bitmap from the new active agent, wherein the at least one bitmap represents information relating to at least one object of the plurality of objects. The network manager interprets the at least one bitmap by utilizing the mapping of bitmap types to object types in order to determine a status of the at least one object of the plurality of objects. The method may further comprise the step(s) of when the status of the at least one object indicates an abnormal condition, requesting, by the network manager, a detailed status of the at least one object from the new active agent; when the status of the at least one object indicates an abnormal condition, requesting, by the network manager, a detailed status from the new active agent; and/or requesting, by the network manager, that the new active agent send to the network manager a current bitmap for the at least one object of the plurality of objects at any time while the at least one communication resource remains in service. A network manager may be arranged and constructed to perform the steps of the method.

A communication system in accordance with the present invention is shown in FIG. 1. A network manager 101, such as a Zone Manager™ network manager, available from Motorola, Inc., is attached to one or more wide-area call controllers 103 and 105 and a router 107 via a local area network (LAN) 149 to form a first subnetwork or subnet. The network manager is a computing device with a storage device or memory that stores the program of the network manager. Each wide-area call controller 103 or 105 may be a Zone Controller™ wide-area call controller, available from Motorola, Inc. The router 107, such as routers readily available in the industry, generally provides the function of interfacing each of the devices on its subnet to a wide area network (WAN) 147. The WAN 147 may be a combination of switches, hubs, and routers, such as the internet or a frame relay network available from Cisco Systems, Inc., which combination generally supports communications between subnets.

A second subnet in this communication system includes a router 109, a plurality of comparators 111, 113, and 115, and a number of site controllers 117 and 119. The comparators may be OmniTAC™ comparators available from Motorola, Inc., and each site controller 117 and 119 may be a Site Controller available from Motorola, Inc. This subnet, as connected through LAN 151, would be used in a simulcast communication system, but may not necessarily appear in every communication system, and particularly would not appear in non-simulcast systems.

Another subnet is comprised of a router 121 and a plurality of repeaters or base stations 123, 125, and 127. Each of these devices is connected through a LAN 153 to the router 121, which is connected to the WAN 147. Another subnet, similar to the previous subsystem, includes a router 129 and a plurality of repeaters 131, 133, and 135, which are connected through a LAN 155. The router 129 is connected to the WAN 147. Another subnet that may be present includes a router 137, and a plurality of repeaters 139, 141, 143, and 145 that have call control capability, i.e., the site controller function is provided by one or more of these repeaters, which may be IntelliRepeater™ base stations or repeaters, also known as intelligent repeaters, available from Motorola, Inc. This subnet is connected through a LAN 157.

Each of the LANs 149, 151, 153, 155, and 157 may be ethernet local area networks readily available in the industry. Each of the routers 107, 109, 121, 129, and 137 generally performs the same function of routing packets between each of the subnets that are connected to the WAN 147.

Each of the objects (e.g., zone controller 103, comparator 111, site controller 117, repeater 123), has an agent associated with it. A plurality of agents 159, 161, 163, 165, 167, 169, 171, 173, 175, 177, 179, 181, 183, 185, 187, 189, and 191, record information regarding the objects that the agent represents. The agent 159 for the zone controller 103 reports information specific to the zone controller 103, such as the relative health of the hard drive and memory within the zone controller 103. The agent 159 may also keep status information such as whether or not the zone controller 103 is operational, what type of functionality it is presently capable of performing, and so forth. The agent 173 for a repeater 123 would report on the health of the various components of the repeater, such as the power amplifier, exciter, receiver, and so forth. The agent 173 may also report on the status of the channel that the repeater sources, such as TDM (time division multiplexed) slots, transmit-receive pairs, wireline links, and so forth.

Generally, a communication system is comprised of objects. The objects may be devices, such as controllers (wide-area call or site), comparators, consoles, microwave devices, routers, telephone interconnect switches, workstations, servers, computers, repeaters, and intelligent repeaters. The objects may be parts, or sub-parts, of devices, such as power supplies, power amplifiers (PAs), receivers, exciters, transmitters, disc drives, control boards, network cards, repeater communication ports, and other manageable subcomponents of devices. The objects may be logical/physical entities such as RF or wireline links, RF or wireline channels, sites, and zones, environmental controls for buildings, including temperature, light status (on or off), door status (open or closed), and so forth.

Each of the objects is represented by one or more agents. An agent represents one or more objects and monitors objects for fault and performance information as well as providing configuration for the objects which the agent represents. In the preferred embodiment, the agent is a software program that runs on a device. Agents may represent objects found on different subnets. The agents update and maintain bitmaps to efficiently store information about the object(s) the agent represents. A single bitmap may represent objects on different subnets. Successful practice of the invention does not require any specific grouping of the objects, or that a single LAN connect the objects of a subsystem.

A flowchart showing a method of reading and interpreting bitmaps is shown in FIG. 2. At step 201, a mapping of bitmap types to object types is read by a network manager 101 for a plurality of objects that are represented by at least one agent. The mapping of bitmap types to object types provides an index by which each object's normal state and cause to be normal are mapped. A table showing a mapping of bitmap types to object types is shown in Table 1.

TABLE 1

| Index | Object Type | Normal State | Normal Cause |
|---|---|---|---|
| 1 | Subsite | Enabled | Manager Request |
| 2 | Comparator Subsite Link | Active | Manager Request |
| 2 | Comparator Audio Path | Enabled | Manager Request |
| 3 | Base Station Power Supply | Enabled | Manager Request |
| 3 | Base Station Receiver | Enabled | Manager Request |

At step 203, the network manager monitors communication resources between the network manager 101 and at least one of the agents operating in the communication system for which the network manager is providing management services. In the preferred embodiment, the network manager 101 monitors all resources between the network manager 101 and all agents. At step 205, it is determined if it is time for a periodic bitmap reading. If it is not time, the process continues with step 207. If it is time, the process continues with step 209, where the network manager 101 requests and receives the bitmap(s) from the appropriate agents, and the process continues with step 211.

At step 207, it is determined if a service interruption has ended. Generally, at step 207, the network manager 101 monitors for service interruptions, and then monitors those resources that have been interrupted to determine when that service interruption has ended, i.e., to determine when the communication resource has returned to service. If an end of a service interruption is not detected at step 207, the process continues with step 203. If the end of a service interruption is detected at step 207, the process continues with step 209, where a bitmap is requested from the agent and received by the network manager 101. At step 211, the bitmap is read by the network manager. The bitmap consists of ones and zeros in a matrix or array for which each bit is assigned to one or more objects based on the mapping of bitmap types to object types.

TABLE 2

| Index | Bitmap Type Index | Parent ID | BM Size | BM Value |
|---|---|---|---|---|
| 1 | 1 | 0 | 2 | 10 |
| 2 | 2 | 0 | 3 | 000 |
| 3 | 3 | 1 | 3 | 100 |
| 4 | 3 | 2 | 3 | 000 |

At step 213, the bitmap is interpreted. The bitmap is interpreted by the network manager 101 in order to determine the status of at least one object of the plurality of objects for which the network manager 101 provides management services. The bitmap is interpreted by utilizing the mapping of bitmap types to object types. At step 215, the bitmap is analyzed to find any abnormal conditions, which, in the preferred embodiment are represented by 1s, and to determine what objects are associated with those 1s.

An example of interpreting bitmaps utilizing mappings of bitmap type to object type in accordance with the preferred embodiment is as follows. The following describes how to determine the objects that are represented by a given bitmap. A row in the Bitmap Table, Table 2, is processed as follows. All object types are found in Table 1, the Bitmap Types to Object Type Table, which object types match the given Bitmap Type Index in the Bitmap Table. For example, if index 2 is being considered, two rows in the Bitmap Type to Object Type Table would match the Bitmap Type Index: those reflects the object types of Comparator Subsite Link and Comparator Audio Path. The Bitmap Size field indicates how many objects utilize this index, and one bit for each of these objects appears in the bitmap value, i.e., for a bitmap size of two, the bitmap value includes two bits, for a bitmap size of three, the bitmap value includes three bits, and so forth.

For each of the matching rows in the Bitmap Type to Object Type Table, if the Parent ID from the Bitmap Table is not "0," the entry in the "Object Type" column of the Bitmap Type to Object Type table added to the Parent ID from the bitmap table. The resulting identifier specifies the particular objects of the given Object Type contained within the Parent ID. For example, for index 4, the Parent ID is 2, the resulting identifier would be "Base Station Receiver.2," which represents all base station receivers at subsite 2.

The exact objects each bit represents are then determined. For each bit value in the bitmap, the number of the bit position is determined. In the preferred embodiment, the leftmost bit position yields number 1, the next bit position yields number 2, and so forth. This number is then added to the identifier, "Base Station Receiver.2," previously determined. For example, the first bit would produce an identifier for a base station receiver of "Base Station Receiver.2.1" to indicate this is the receiver for base station 1 at subsite 2. In this example, there are three base stations at subsite 2.

If there are no abnormal conditions at step 213, the process continues with step 217, where the network manager 101 updates the object status (es) to a specified normal state. The specified normal state is found in the mapping of bitmap types to object types. In the preferred embodiment, the mapping of bitmap types to object types is called a "bitmap map." When there are no abnormal conditions, or 1s, in the bitmap, this indicates that all objects reported for in the bitmap are in a normal state. After step 217, the process continues with step 203.

If at step 215, there are abnormal conditions indicated in the bitmap, the process continues with step 219, where a detailed status is requested by the network manager 101. In the preferred embodiment, a bit equal to 1 indicates that the object has an abnormal condition or state. An abnormal condition or state, which states include failure or malfunction, inability to perform completely up to specification, condition of illegal carrier detected on a channel, condition of interference detection, failure to respond, under maintenance, and so forth. An abnormal condition or state includes situations where the object has failed or malfunctioned, the object is not performing up to specification, an illegal carrier is detected on a channel or link, communication resource interference is detected, an object fails to respond, an object is under maintenance, and so forth. At step 219, a detailed status is requested for each of the objects for which an abnormal condition is indicated. The detailed status is requested from one or more of the agents that represent the objects for which the abnormal condition was sighted in the bitmap. Examples of detailed status tables as maintained by agents are shown in Table 3, for a first agent, and Table 4, for a second agent. Once the detailed status(es) is received from that agent at step 221, the object status(es) is updated in the network manager 101, and the process continues with step 203. Optionally, the status (es) for that object(s) (normal or abnormal) may be displayed for a user of the network manager 101. An example of a detailed status table, as stored by the network manager 101, is shown in Table 5.

TABLE 3

| ID of Object | Detailed Status | Cause |
| --- | --- | --- |
| IRbd.1 | Enabled | Manager Request |
| IRbd.2 | Enabled | Manager Request |
| IRbd.3 | Enabled | Manager Request |
| IRpt.1 | Active | Manager Request |
| IRpt.2 | Active | Manager Request |
| IRpt.3 | Active | Manager Request |

TABLE 4

| ID of Object | Detailed Status | Cause |
| --- | --- | --- |
| IRbd.1 | Malfunctioning | Parity error |
| IRbd.2 | Enabled | Manager Request |
| IRbd.3 | Enabled | Manager Request |

TABLE 5

| ID of Object | Detailed Status | Cause |
| --- | --- | --- |
| IRbd.1.1 | Enabled | Manager Request |
| IRbd.1.2 | Enabled | Manager Request |
| IRbd.1.3 | Enabled | Manager Request |
| IRbd.2.1 | Malfunctioning | Parity error |
| IRbd.2.2 | Enabled | Manager Request |
| IRbd.2.3 | Enabled | Manager Request |
| IRpt.1.1 | Active | Manager Request |
| IRpt.1.2 | Active | Manager Request |
| IRpt.1.3 | Active | Manager Request |

A flowchart describing a method of updating and maintaining a bitmap by an agent is shown in FIG. 3. At step 301, the agent monitors the detailed status for each of the objects that it represents. At step 303, if an object status change is detected, the process continues with step 305, where it is determined if the bitmap representing that particular object is local, i.e., is the same agent that has detected the status change, or if a different agent maintains the bitmap for this particular change status. If the bitmap is local, the process continues with step 307, where the agent updates the bitmap, and the process continues with step 301. If at step 305, the bitmap is not local, the process continues with step 309, where the agent determines which other agent contains the required bitmap, and instructs that agent to update the bitmap, and the process continues with step 301.

Figure 4:
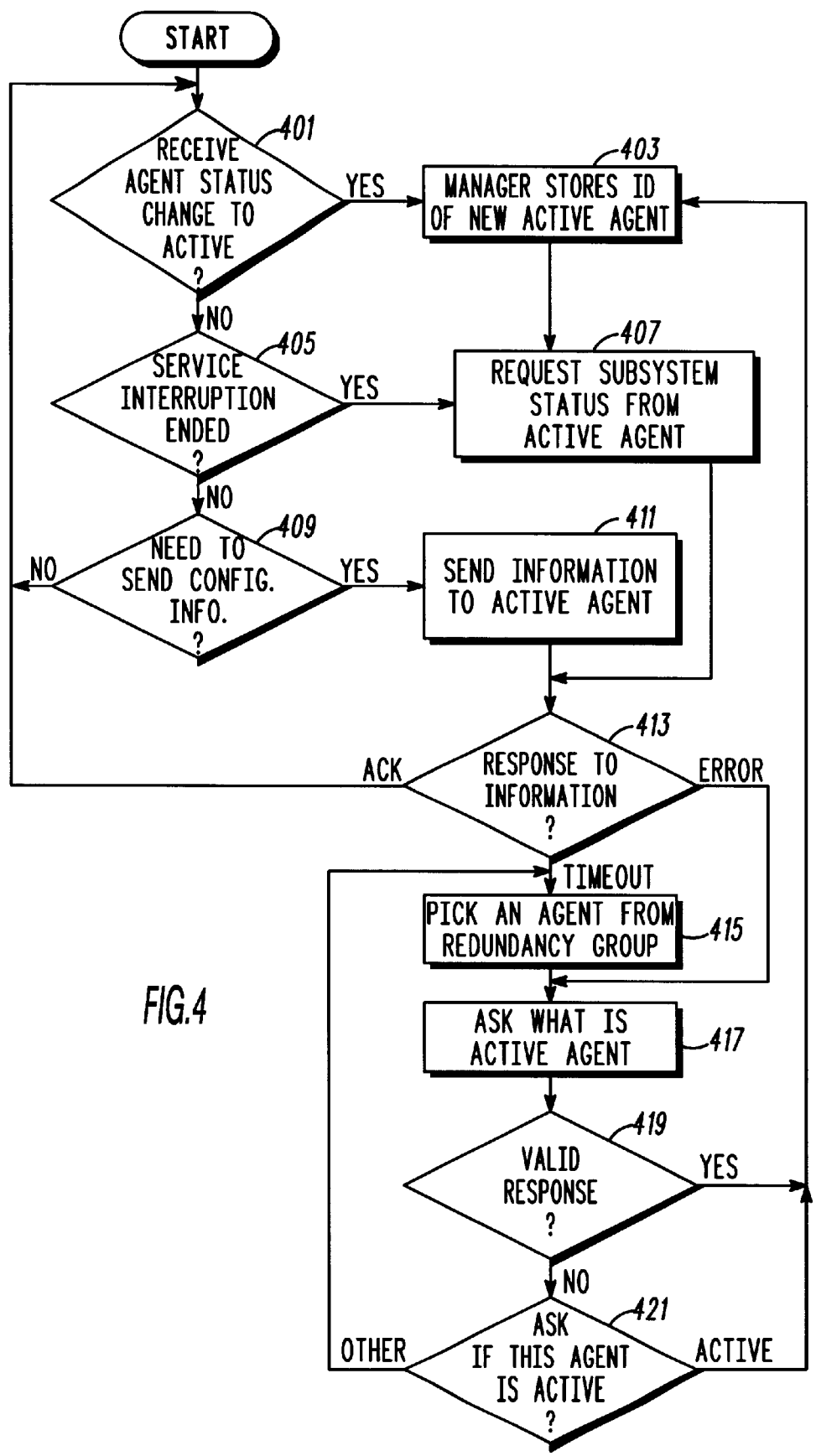
FIG. 4 is a flowchart showing a method of updating and maintaining a bitmap by an agent in accordance with the invention.

A flowchart showing a method of managing a communication system through use of multiple, or redundant agents is shown in FIG. 4. The steps of FIG. 4 are performed by a network manager 101 in the preferred embodiment. The method of FIG. 4 is used in the situation where redundant agents can handle the network management functions for a subsystem. A subsystem includes one or more objects that are the domain of a set of redundant agents. Redundant agents are agents that support network management functions for the same object(s). A redundancy group is comprised of all the redundant agents that a capable of becoming an active agent. Examples of redundant agent sets include site controllers 115 and 117, wide-area call controllers 103 and 105, and the intelligent repeaters that provide call control 139, 141, 143, and 145. One of the site controllers may provide a bitmap for all the objects at its site, including the comparators 111, 113, and 115, and the repeaters 123, 125, and 127. One of the wide-area call controllers 103 may provide a bitmap for all the objects at its zone, including all of the objects on the subnets supported by the LANs 151, 153, 155, and 157. An active agent is one of the agents of the redundancy group that is currently reporting and updating bitmap information and is generally representing the subsystem. It is necessary that only one agent generally represents a subsystem to prevent conflicts in managing that subsystem's objects.

The network manager 101 is comprised of a software program that collects and reports object information for a user of the communication system, among other functions. One of the functions of the network manager 101 is to provide the functions shown in the flowchart of FIG. 4. At step 401, it is determined if the network manager 101 has received a change in agent status from inactive to active. If such a status has been received, the process continues with step 403, where the manager stores the ID of the new active agent, and the process continues with step 407. If at step 401, an agent status change is not received, the process continues with step 405, where it is determined if a service interruption has ended. A service interruption ending in the communication system is a time for the network manager to re-synchronize its bitmaps because the service interruption may have caused or been caused by an abnormal condition in any of the objects using or near the resource on which service was interrupted. If such a transition was detected at step 405, the process continues with step 407, where the network manager 101 requests the subsystem status from the active agent, and the process continues with step 413.

If at step 405, there is no transition detected, the process continues with step 409, where it is determined if there is a need to send configuration information. If there is no such need, the process continues with step 401. If there is such a need at step 409, the process continues with step 411 where the information is sent to the active agent for the redundancy group. The process then continues with step 413, where it is determined if a response to the information has been received. If an acknowledgment was received, the process continues with step 401. If an error was received, the process continues with step 417. If the response was a time-out at step 413, the process continues with step 415, where the network manager 101 arbitrarily picks an agent from the redundancy group. At step 417, the network manager 101 asks who is the active agent. If a valid response is received at step 419, the process continues with step 403, where the manager stores the ID of the new active agent. If a valid response is not received at step 419, the process continues with step 421, where it is determined if the present agent selected by the network manager 101 is the active agent. If the agent responds that it is active, then the process continues with step 403. If the response from the agent to being asked if it is active is other than an active state, including if an error occurred, a time out occurred, or if the agent itself said it was not active, the process continues with step 415, where the network manager continues through this loop until it has found the active agent for the redundancy group by cycling through each of the redundant agents.

The present method for network management, through obtaining and updating object status information, has many benefits over prior methods. Communication systems may contain tens of thousands of objects, the status of which a network manager needs to obtain and display. When communication resources between a network manager and agents for the objects within the communication system experience service interruption, the change of object status is not communicated to the network manager with previous solutions. The status of the objects may not be updated at the network manager for a long period time. The present method teaches a novel approach of monitoring communication resources and detecting the end of a service interruption, and after the return to service of the communication resource, the network manager requests bitmaps of object statuses. Utilizing the bitmaps, the network manager can quickly and efficiently obtain status updates of thousands of communication system objects. A grouping of logical and physical objects in a communications system may be represented by a single agent. The agent provides bitmaps representing the status of the objects in each group or subsystem. Often redundant agents are utilized to represent groups of objects or subsystems. In the event of an agent failure, a redundant agent will assume representation of the grouping of objects from the failed agent. The present method provides a procedure where a network manager quickly determines the agent that is active and queries it for bitmaps. These processes of the present invention provide ways for the network manager to obtain and maintain updated status information for all objects at all times.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   reading, by a network manager for a plurality of objects represented by at least one agent and residing in a communication system, a mapping of bitmap types to object types;
   monitoring a communication resource between the network manager and an agent of the at least one agents;
   after service interruption on the communication resource, and upon detecting a return to service of the communication resource, reading, by the network manager, at least one bitmap from the agent, wherein the at least one bitmap represents information relating to at least one object of the plurality of objects; and
   interpreting, by the network manager, the at least one bitmap by utilizing the mapping of bitmap types to object types in order to determine a status of the at least one object of the plurality of objects.

2. The method of claim 1, further comprising the step of updating, by the network manager, the status for the at least one object of the plurality of objects in a storage device within the network manager.

3. The method of claim 1, further comprising the step of displaying, by the network manager, the status of the at least one object of the plurality of objects to a user of the network manager.

4. The method of claim 1, wherein the plurality of objects are logical or physical entities within a radio frequency communication system.

5. The method of claim 1, further comprising the step of, when the status of the at least one object indicates an abnormal condition, requesting, by the network manager, a detailed status of the at least one object from the agent.

6. The method of claim 1, wherein the at least one agent comprises at least a first and second agent, wherein the first agent maintains a bitmap for the at least one object of the plurality of objects, and wherein the second agent maintains a detailed status for the at least one object of the plurality of objects.

7. The method of claim 6, further comprising the step of, when the status of the at least one object indicates an abnormal condition, requesting, by the network manager, a detailed status from the second agent.

8. The method of claim 1, wherein two or more agents have the capability of being the active agent for a subsystem, further comprising the step of determining an active agent for the subsystem, and communicating with the active agent regarding bitmap activity for the subsystem, wherein the subsystem comprises a subset of the plurality of objects.

9. The method of claim 1, wherein the mapping of bitmap types to object types is different for each subsystem of the communication system, wherein each subsystem comprises a subset of the plurality of objects.

10. The method of claim 1, further comprising the step of requesting, by the network manager, that the at least one agent send to the network manager a current bitmap for the at least one object of the plurality of objects at any time while the at least one communication resource remains in service.

11. In a communication system having a network manager for a plurality of objects that are represented by at least one agent, a method comprising the steps of:
   monitoring, by an agent of the at least one agents a detailed status of at least one object of the plurality of objects; and
   upon detecting a change in detailed status of the at least one object, causing a bitmap for the at least one object to be updated to include the change in detailed status, wherein one bit of the bitmap represents two or more objects of the plurality of objects, wherein a bit value of 1 represents an abnormal condition for at least one of the two or more objects, wherein a bit value of 0 represents a normal condition for all of the two or more objects, further comprising the step of providing an identity of whichever objects caused a bit value of 1 in a bitmap when the agent is queried for the source of an abnormal condition appearing in a bitmap.

12. In a communication system comprised of a network manager, a plurality of communication resources, and one or more subsystems, wherein a subsystem is represented by an active agent from a plurality of agents and wherein the subsystem is comprised of a plurality of objects, a method comprising the steps of:
   reading, by the network manager, a mapping of bitmap types to object types;
   monitoring a communication resource, of the plurality of resources, between the network manager and the active agent;
   after service interruption on the communication resource, and upon detecting a return to service of the communication resource, requesting subsystem information for the subsystem represented by the active agent;
   if valid subsystem information is not received from the active agent, determining a new active agent from among the plurality of agents;

requesting, by the network manager, at least one bitmap from the new active agent;

reading, by the network manager, the at least one bitmap from the new active agent, wherein the at least one bitmap represents information relating to at least one object of the plurality of objects; and interpreting, by the network manager, the at least one bitmap by utilizing the mapping of bitmap types to object types in order to determine a status of the at least one object of the plurality of objects.

13. The method of claim 12, further comprising the step of, when the status of the at least one object indicates an abnormal condition, requesting, by the network manager, a detailed status of the at least one object from the new active agent.

14. The method of claim 12, further comprising the step of requesting, by the network manager, that the new active agent send to the network manager a current bitmap for the at least one object of the plurality of objects at any time while the communication resource remains in service.

* * * * *